United States Patent
Tominaga et al.

(10) Patent No.: US 6,425,287 B1
(45) Date of Patent: Jul. 30, 2002

(54) MICROFLOW SENSOR ELEMENT AND MANUFACTURING METHOD THEREOF

(75) Inventors: Koji Tominaga; Shuji Takada; Koichi Matsumoto, all of Kyoto (JP)

(73) Assignee: Horiba, Ltd., Kyoto (JP)

( * ) Notice: Subject to any disclaimer, the term of this patent is extended or adjusted under 35 U.S.C. 154(b) by 0 days.

(21) Appl. No.: 09/321,735

(22) Filed: May 28, 1999

(30) Foreign Application Priority Data

Jun. 26, 1998 (JP) .......................................... 10-181172

(51) Int. Cl.[7] ................................................. G01F 1/68
(52) U.S. Cl. ................................................. 73/204.26
(58) Field of Search ..................... 73/204.23, 204.11, 73/204.26; 257/467; 216/20

(56) References Cited

U.S. PATENT DOCUMENTS

| 4,024,560 | A | * | 5/1977 | Miller et al. ..................... 29/78 |
| 5,413,667 | A | * | 5/1995 | Fujii et al. ..................... 216/20 |
| 5,477,734 | A | * | 12/1995 | Zemel et al. ............ 73/204.23 |
| 5,483,067 | A | * | 1/1996 | Fujii et al. ............... 250/338.3 |
| 5,672,903 | A | * | 9/1997 | Butler et al. ................. 257/467 |
| 5,866,238 | A | * | 2/1999 | Takayama et al. .......... 428/209 |

* cited by examiner

Primary Examiner—Benjamin R. Fuller
Assistant Examiner—Jewel V. Artis
(74) Attorney, Agent, or Firm—Sughrue Mion, PLLC (57) ABSTRACT

A microflow sensor element for obtaining a response quickly with high response sensitivity regardless of the direction of an air flow. A pyroelectric detection unit is provided on a substrate, the pyroelectric detection unit having an upper and a lower electrode which are respectively provided on the surface and undersurface of a ferroelectric thin film. A heater portion whose temperature is modulated periodically as designated is provided on the upper electrode via a thin film of insulating material.

3 Claims, 11 Drawing Sheets

MICROFLOW SENSOR ELEMENT AND MANUFACTURING METHOD THEREOF

BACKGROUND OF THE INVENTION

This invention relates to a microflow sensor element for detecting a flow of gas and a manufacturing method thereof.

Figure 9A:
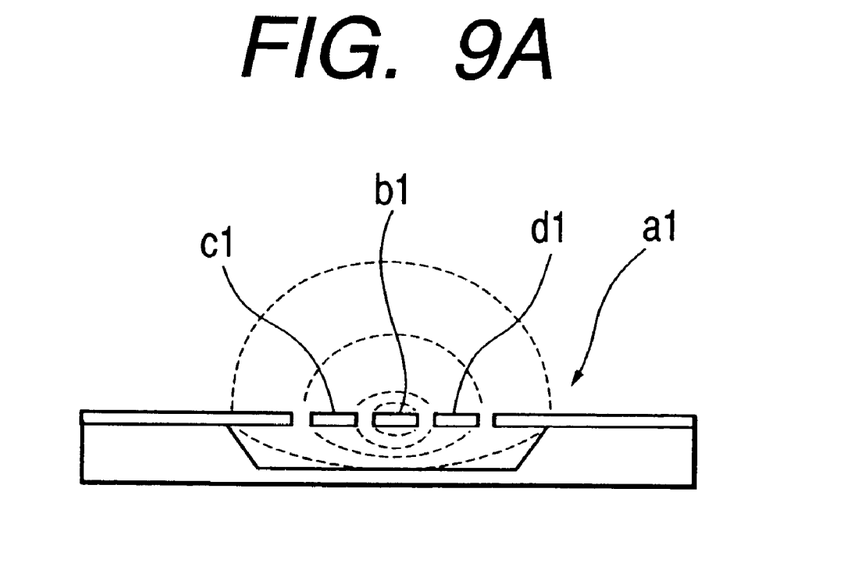
FIGS. 9A and 9B are diagrams illustrative of the measurement principle of a conventional microflow sensor element.
Figure 9B:
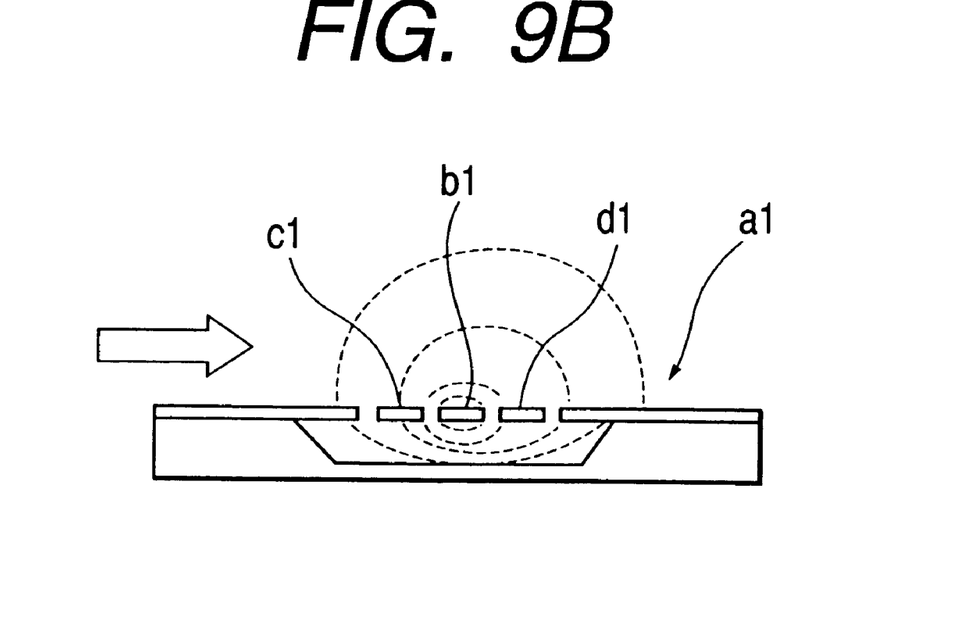

In a conventional microflow sensor chip of the sort shown in FIGS. 9A and 9B, a heater portion b1 disposed in the center of a sensor chip a is heated by an electric circuit (not shown) to a temperature higher by a predetermined degree than the temperature of a fluid to be detected and when no air flow exists, the temperatures of temperature sensors c1 and d1 symmetrically arranged on both sides of the heater portion b1 are equal. Circular arcs of broken lines indicate isotherms.

When the air current is received, however, there is produced a temperature difference between both the temperature sensors c1 and d1 because the symmetry of the temperature distribution is broken, and the temperature of the temperature sensor c1 on the upwind side becomes lower than that of the temperature sensor d1 on the leeward side. The temperature difference then causes the resistance value to vary, which is converted into an electrical signal whereby to obtain an detection output.

Since the detection output is obtained from a change in the temperature distribution in the case of the aforementioned microflow sensor element, the drawback is that the detection output varies according to the temperature difference in the direction of the air flow. Consequently, it has been arranged that an air flow in a substantially laminar-flow condition is passed over the element in a fixed direction.

When the air flow is detected in a closed space, for example, the direction of the air flow tends to vary and besides air turbulence may occur, which makes it difficult to gain highly accurate measured values from the aforementioned conventional microflow sensor element.

Figure 10:
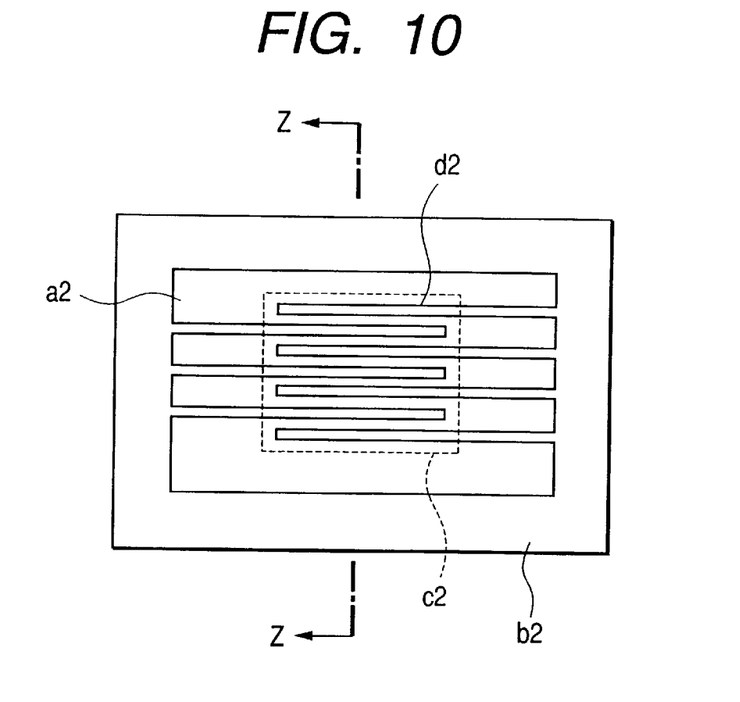
FIG. 10 is a plan view of a conventional thermal flow detector element.
Figure 11:
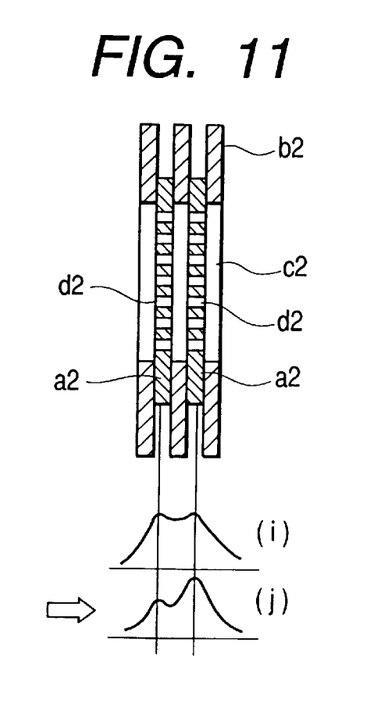
FIG. 11 is section Z—Z of FIG. 10.

Another thermal flow detector element is shown in FIGS. 10 and 11, which consists of two heaters a2 that are made of a metal (e.g. Ni) foil and that run in a serpentine path and plates b2 that are made of an insulating material such as glass and which support the two heaters a2 in a face-to-face relationship. The plates b2 have an opening c2 and the gaps d2 between adjacent branches of each heater a2 that are located within the opening c2 provide gas flow channels.

With a constant voltage being applied to the heaters a2 so that their temperature becomes higher than that of the gas in the gas compartments by a certain value, the two heaters a provide the temperature profile shown by (i) in FIG. 11 if there is no gas flow. However, if the gas flows through the gaps d2 as indicated by an arrow, the heater a2 in the upstream position is cooled in accordance with the gas flow rate whereas the heater a2 in the downstream position is heated with the heat taken from the upstream heater a2; as the result, the two heaters a2 provide the temperature profile shown by (j) in FIG. 11. This temperature change causes a change in the resistance of the heaters a2, which is measured with a Wheatstone bridge or the like, thereby detecting the gas flow.

The conventional thermal flow detector element shown in FIGS. 10 and 11 has the following problems. Since all gaps d2 between adjacent branches of each heater a2 that are located within the opening c2 serve as gas flow channels, the channel or flow path area is large compared to the area of the detector element and the gas flow rate is so much retarded that the change in the temperature of the heaters a2 due to the gas flow is insufficient to provide high sensitivity.

That part of the heaters a which is located within the opening c2 (i.e., which is not supported with the plates b2) must have a sufficient strength to retain shape, so a thick enough metal foil has to be used to compose the heaters a2. However, if the thickness of the heaters a2 is increased, the heat capacity increases correspondingly to slow down the response speed.

SUMMARY OF THE INVENTION

In view of the actual situation mentioned above, an object of the present invention is to provide a microflow sensor element for making obtainable a response quickly with high response sensitivity regardless of the direction of an air current.

According to the present invention, a pyroelectric detection unit is provided on a substrate, the pyroelectric detection unit having an upper and a lower electrode which are respectively provided on the surface and undersurface of a ferroelectric thin film, and that a heater portion whose temperature is modulated periodically as designated is provided on the upper electrode via a thin film of insulating material.

Further, according to the present invention, through-holes for use in gas venting are provided in or around the pyroelectric detection unit.

By letting an electric current flow periodically into the heater portion, a pyroelectric current can be detected in the pyroelectric detection unit in proportion to the degree of a change in the temperature rising then. The detection output is decreased because the temperature of the heater portion is restrained from rising by a flow of gas while the flow of gas is existing around the microflow sensor element. Thus, the flow rate of the gas is made detectable by the output difference.

Since the pyroelectric detection unit is provided just below the heater portion, it is possible to detect any gas movement quickly with high response sensitivity, however little the gas movement may be and regardless of the direction of the gas movement.

Moreover, the provision of the through-holes for use in gas venting in or around the pyroelectric detection unit allows the detection of even the flow of gas in the direction of a perpendicular plane with respect to the pyroelectric detection unit.

Furthermore, according to the present invention, a gas passage hole whose setting of channel area is smaller than the area of the gap between adjacent segments of a heater to be supplied with a periodic voltage so that its temperature is a certain value higher than the temperature of the gas in the gas compartments is formed in the neighborhood of said heater.

Since gas passage holes of which the channel area is smaller than the area of the gap between adjacent segments of the heater to be supplied with a periodic voltage are provided near the heater, the flow rate of the gas flowing through the gas passage holes is sufficiently increased that the temperature of the heater experiences a great enough change to provide a higher sensitivity.

Moreover, according to the present invention, a process for producing a flow detector element comprises the steps of forming a lower electrode on a substrate, forming a thin ferroelectric film on the lower electrode, forming an upper electrode on the thin ferroelectric film, patterning the upper electrode, the thin ferroelectric film and the lower electrode in that order, with a gas passage through-hole being also formed, thereafter forming a thin insulator film that covers a pyroelectric sensing portion that is composed of the upper electrode, the thin ferroelectric film and the lower electrode, with a through-hole and contact holes being also formed in said thin insulator film, forming a heating electrode film on the thin insulator film, allowing a portion of the heating electrode film to drop in the contact holes to make lead-ins for the upper and lower electrodes, and removing that part of the substrate which is just under the pyroelectric sensing portion to form an opening, thereby producing a pyroelectric flow detector element.

According to the processes described above, gas passage holes can be formed without regard to the conductor size and pattern of the heater and by reducing the channel area of the gas passage holes, the gas flow rate can be sufficiently increased to provide higher sensitivity. In addition, the heater is supported by the thin insulator film, so there is no need to use a thick heating electrode film and pyroelectric flow detector element can be formed as thin enough films to reduce the heat capacity and thereby increase the response speed. A particular advantage results from the pyroelectric flow detector element which theoretically can produce by far greater signal outputs than the thermal type to achieve a marked improvement in detection sensitivity.

BRIEF DESCRIPTION OF THE DRAWINGS

FIGS. 2A–6C are diagrams illustrative of some of the steps of producing the microflow sensor element above;

DESCRIPTION OF THE PREFERRED EMBODIMENT

An embodiment of a microflow sensor element according to the present invention will now be described in detail with reference to the drawings.

Figure 1:
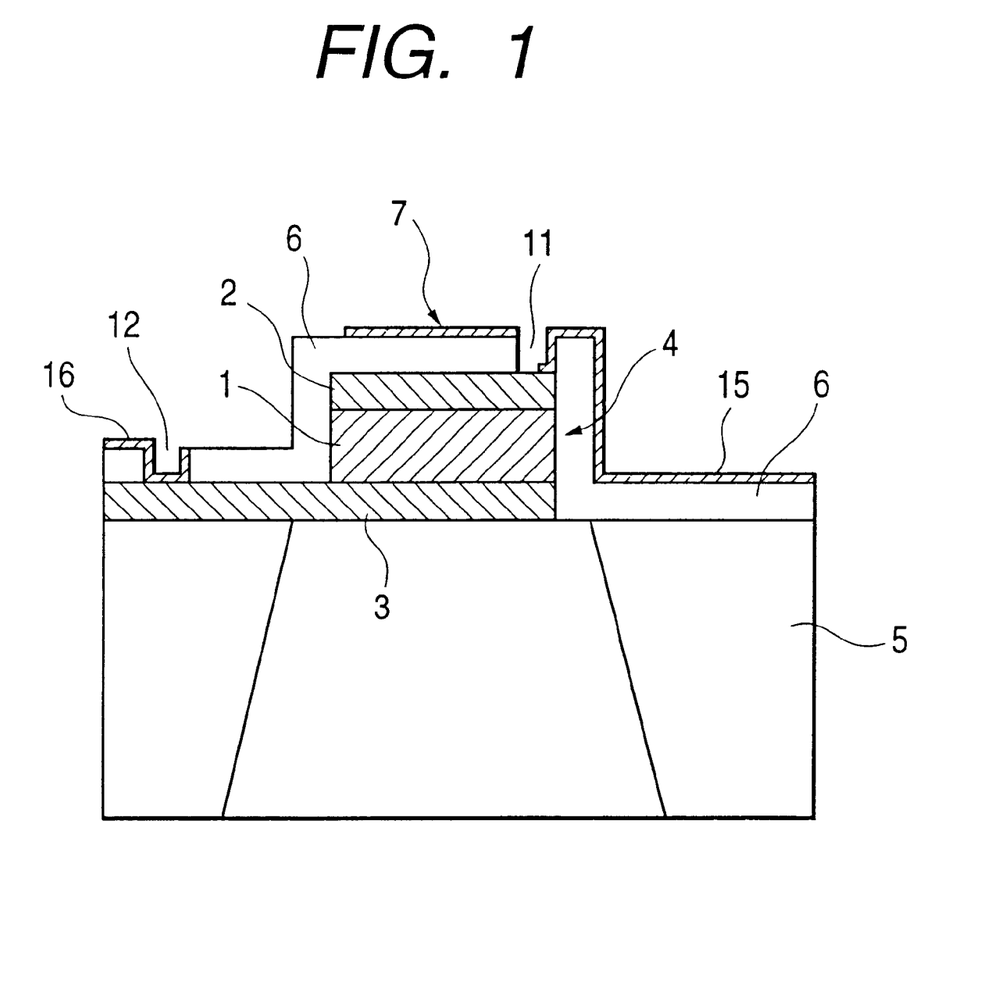
FIG. 1 is an exemplary sectional view of a microflow sensor element according to the present invention.

Referring to FIG. 1 which is a sectional view of an exemplary microflow sensor element according to the present invention, an upper electrode 2 is provided on the surface of a ferroelectric (pyroelectric) thin film 1 and a lower electrode 3 is also provided thereon so as to form a pyroelectric detection unit 4 which is provided on a substrate 5. A heater portion 7 is provided on the surface of the upper electrode 2 via a thin film of insulating material 6, the temperature of the heater portion 7 being modulated periodically as designated.

With the arrangement above, a pyroelectric current can be detected in the pyroelectric detection unit 4 provided right below the heater portion in proportion to the degree of a change in the temperature of the heater portion 7. While a flow of gas is existing around the heater portion 7, a small detected output appears as the temperature of the heater portion 7 is restrained from rising because of the flow of gas and this output difference can be used to detect the flow rate of the gas. In FIG. 1, reference numerals 11 and 12 denote contact holes; 15, an upper extraction electrode; and 16, a lower extraction electrode.

Figure 2A:
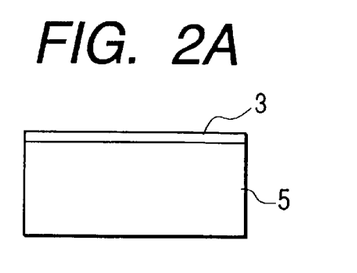
FIGS. 2A–2H are diagrams illustrative of an exemplary process of producing the microflow sensor element above.

An exemplary process of producing such a microflow sensor element as mentioned above will be described (see FIGS. 2A–2H). First, Pt (platinum) as the lower electrode 3 about 2,000 Å thick is formed by sputtering, for example, on the substrate 5 made of MgO (magnesium oxide) or single crystal of Si (silicon) (see FIG. 2A)

Figure 2B:
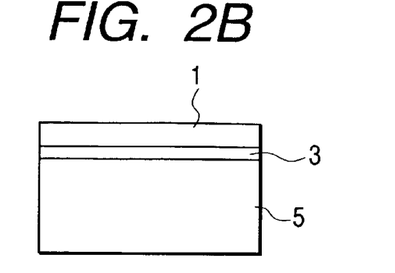

Then, the ferroelectric thin film 1 about 2–5 $\mu$m thick of PZT or PLZT family is formed by MOCVD (Metal Oxide Chemical Vapor Deposition) on the lower electrode 3 (see FIG. 2B).

Figure 2C:
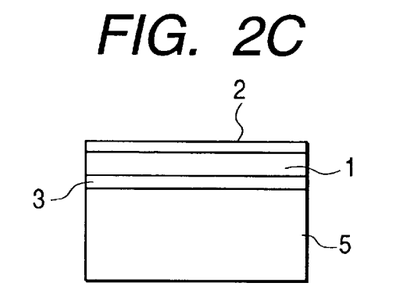
Figure 2D:
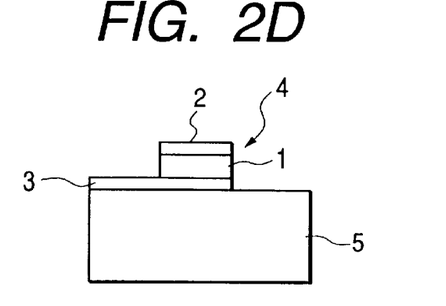
Figure 2E:
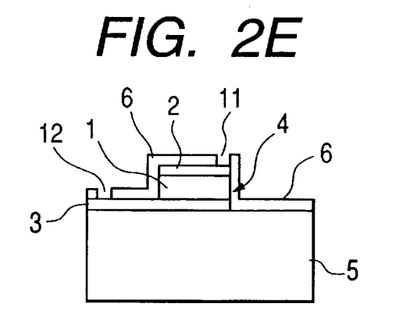
Figure 2F:
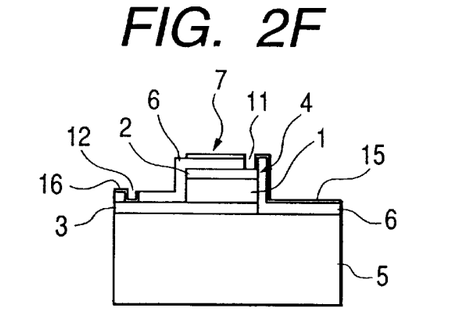

Au (gold) or Pt (platinum) as the upper electrode 2 about 2,000 Å thick is formed by sputtering, for example, on the ferroelectric thin film 1 (see FIG. 2C).

The upper electrode 2, the ferroelectric thin film 1 and the lower electrode 3 are subjected by photolithography to patterning in order (see FIG. 2D); at this time, through-holes (not shown) for etching (and simultaneously for gas venting) are formed therein.

The thin film of insulating material 6 for covering the pyroelectric detection unit 4 is formed. Then through-holes (not shown) for etching (and simultaneously for gas venting) and the contact holes 11 and 12 are formed in the thin film of insulating material 6 (see FIG. 2E). The thin film of insulating material 6 may be an organic film (e. g., of polyimide family) or an inorganic film (e.g., of SiO2) and may preferably have a thermal conductivity lower than that of metal.

Next, an electrode film (e.g., of Pt or NiCr) for a heater as the heater portion 7 on the thin film of insulating material 6 is formed and subjected by photolithography to patterning. Then the Pt or NiCr is dropped into the contact holes 11 and 12 so as to form the extraction electrodes 15 and 16 of the respective upper and lower electrodes 2 and 3 (see FIG. 2F).

Figure 2G:
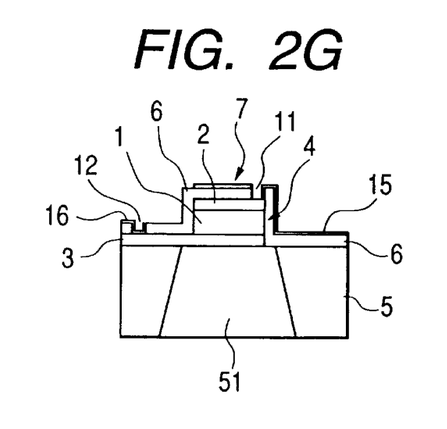
Figure 2H:
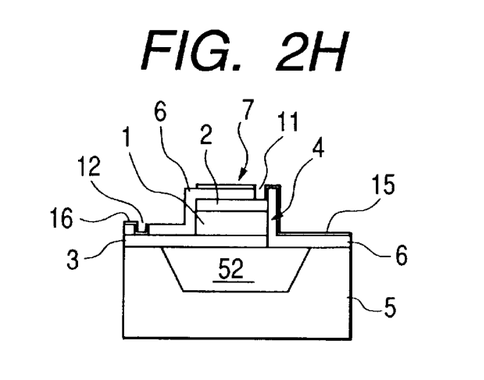

The substrate 5 just below the pyroelectric detection unit 4 is partially removed and this removing work may be done from the surface or undersurface side of the substrate 5. When the removing work is done from the surface side, it is only needed to inject a phosphoric acid solution as an etching solution having a predetermined temperature through the through-holes for etching. In this case, a removed portion 51 which penetrates the substrate 5 may be formed as shown in FIG. 2G or otherwise a hollow portion 52 may be formed as shown in FIG. 2H.

Figure 3:
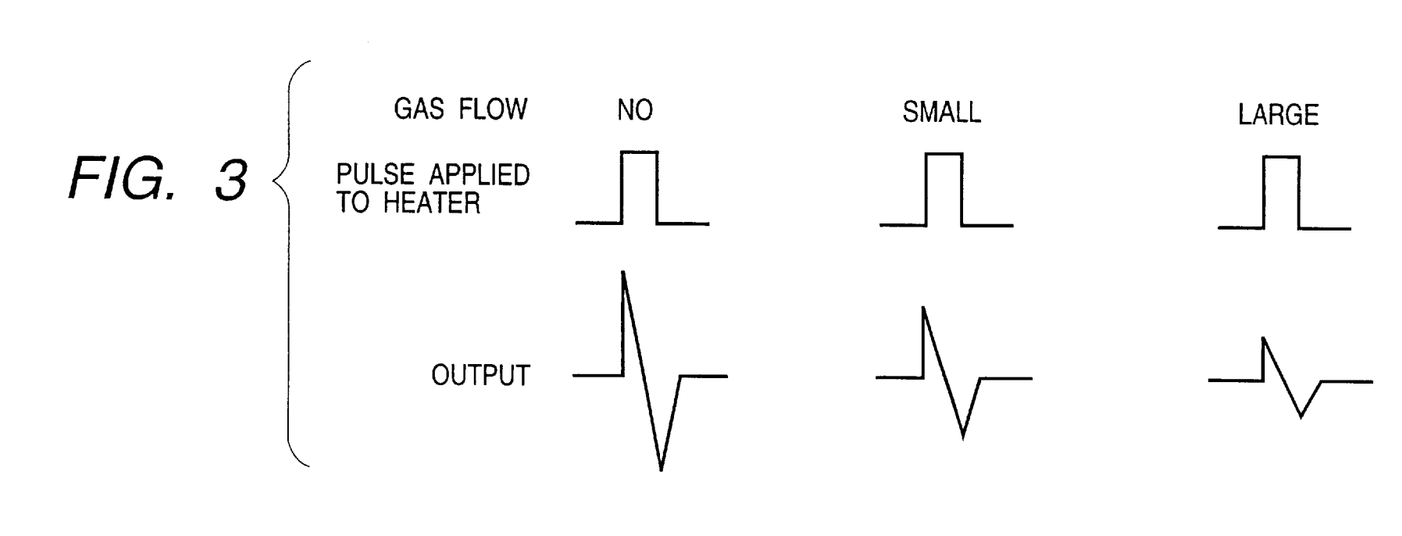
FIG. 3 is a diagram illustrative of a change in the response output of a pyroelectric detection unit in proportion to a change in the flow of gas.

The measuring principle in the microflow sensor element thus arranged will subsequently be described (see FIG. 3). The temperature of the heater portion 7 is periodically raised by letting a pulse current with a certain period flow through the heater portion 7 whereby to make the pyroelectric detection unit 4 detect the temperature variation. However, the detection output will have a maximum value if no gas flow exists.

If the gas flow exists then, the temperature of the heater portion 7 will be prevented from rising and the detection output will be reduced to that extent. In other words, the greater the flow rate of the gas, the smaller the detection output becomes. Consequently, the flow rate of the gas can be obtained from a difference in detection output from the detection output at the time no gas current exists.

The flow of gas in the heater portion 7 may be not directed in a fixed direction nor in the laminar-flow condition. Moreover, the temperature of the heater portion 7 is always suppressed when at least the movement of the gas exists on the surface of the heater portion 7. Since the pyroelectric detection unit 4 used to detect the temperature is disposed right below the heater portion 7, on the other hand, a response can be obtained quickly with extremely high response sensitivity. Therefore, an extremely accurate measured value can always be obtained regardless of the direction of the gas flow.

Figure 4A:
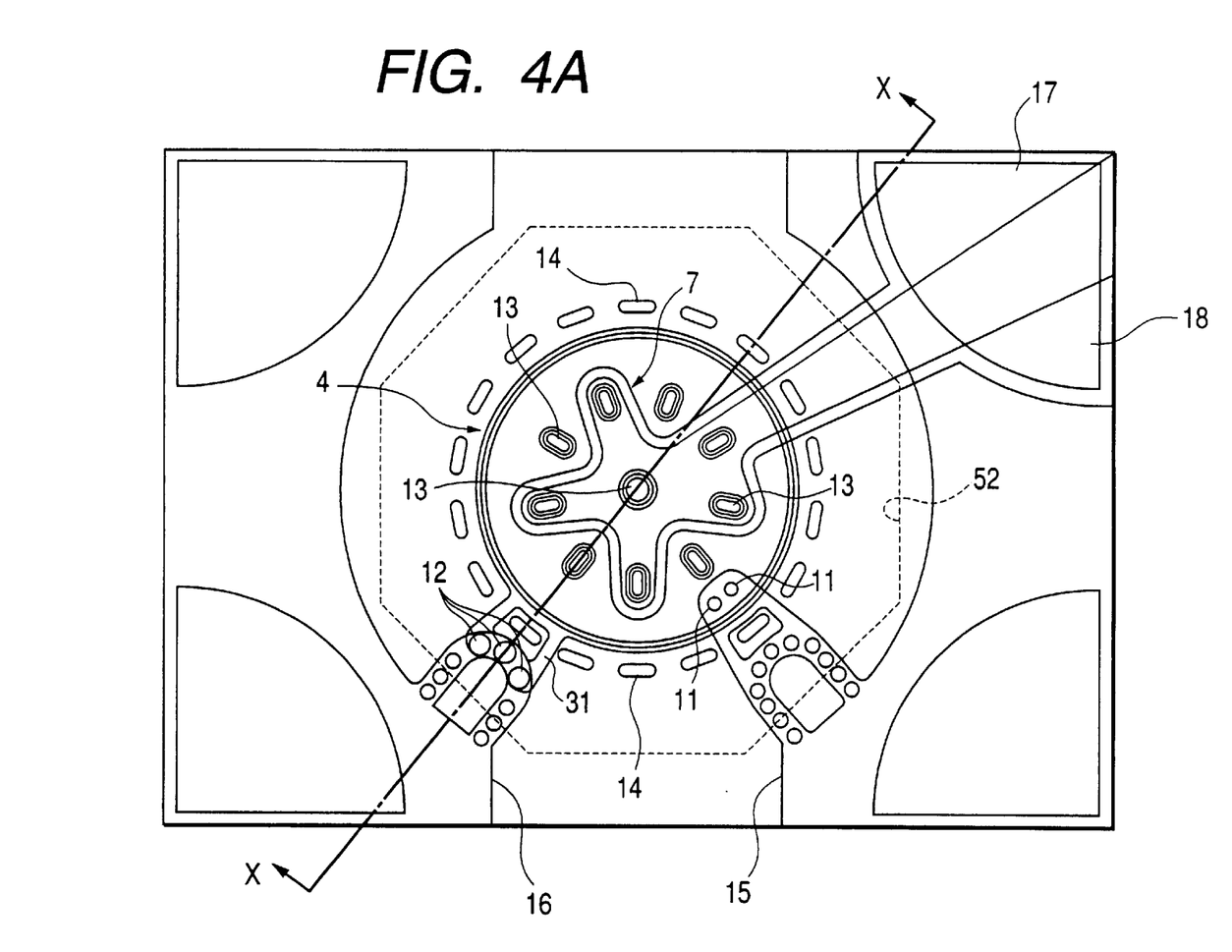
FIGS. 4A and 4B are plan views showing embodiments of the microflow sensor element of the present invention.
Figure 5:
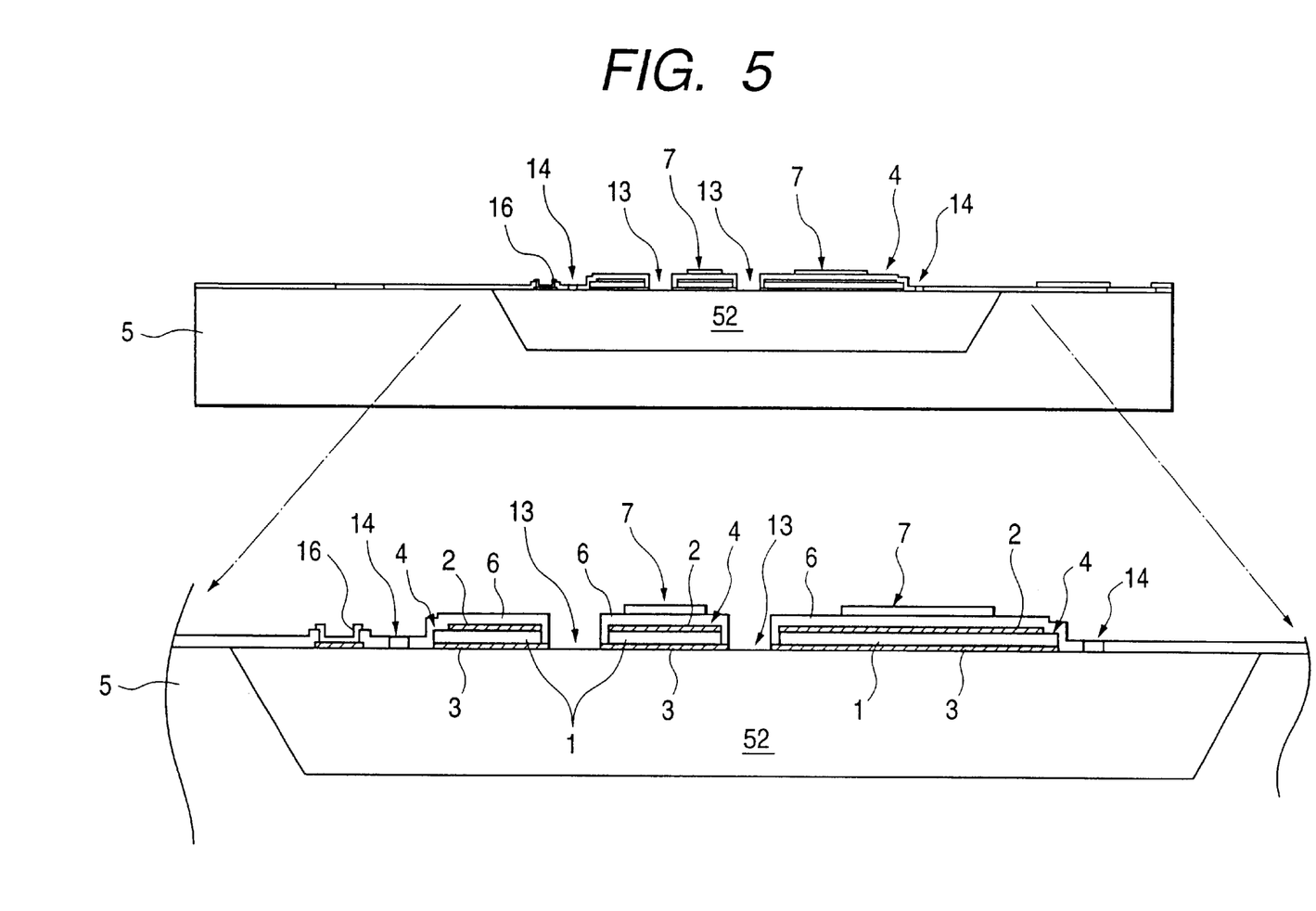
FIG. 5 is a sectional view taken on line X—X of FIG. 4A.
Figure 6A:
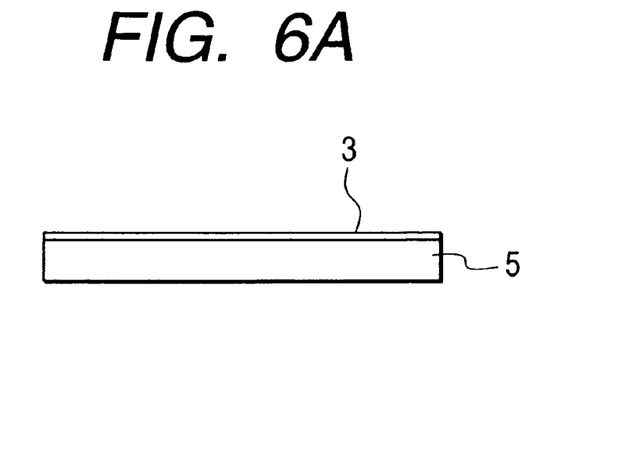
Figure 6B:
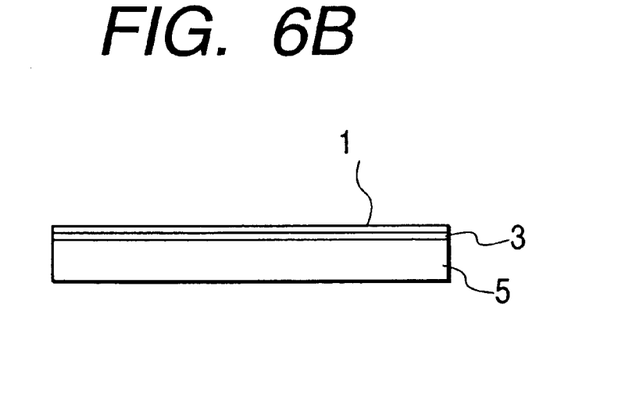
Figure 6C:
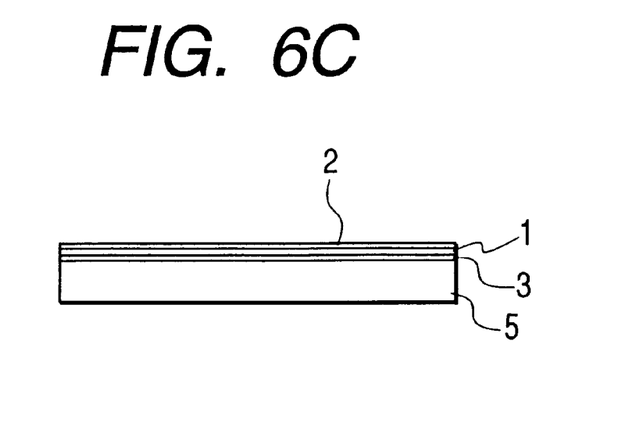
Figure 7A:
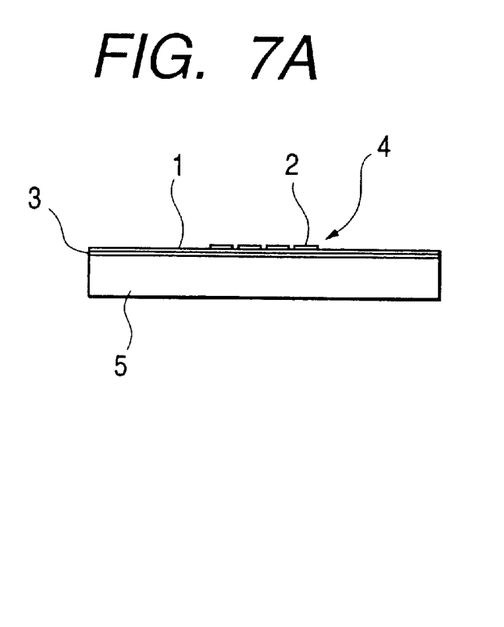
FIGS. 7A–7D are diagrams illustrative of still other steps of producing the same.
Figure 7B:
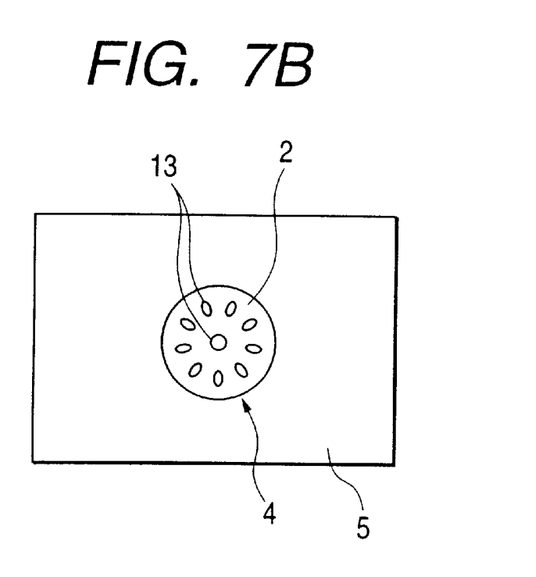
Figure 7C:
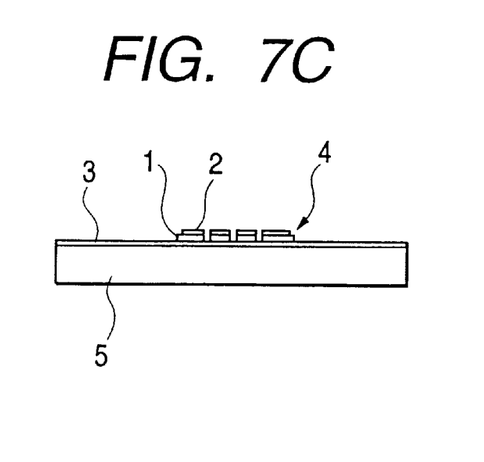
Figure 7D:
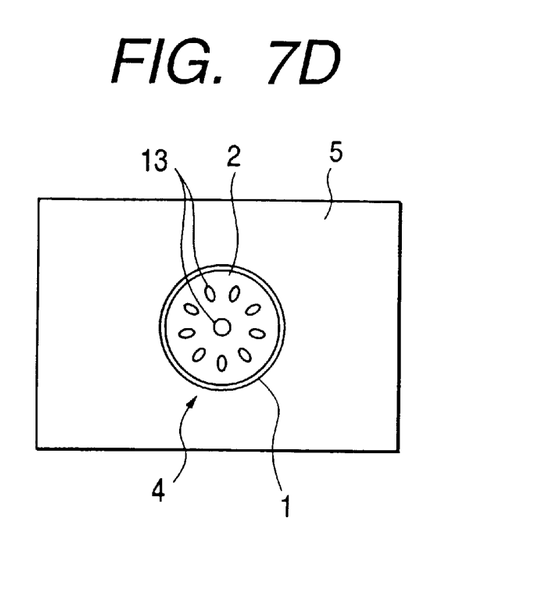

FIG. 4A is a plan view of a preferred embodiment of the microflow sensor element; FIG. 5, a sectional view taken on line X—X of FIG. 5; and FIGS. 6–8, diagrams illustrating steps of producing the microflow sensor element. In these drawings, like reference characters designate like members in FIGS. 1–2.

Figure 4B:
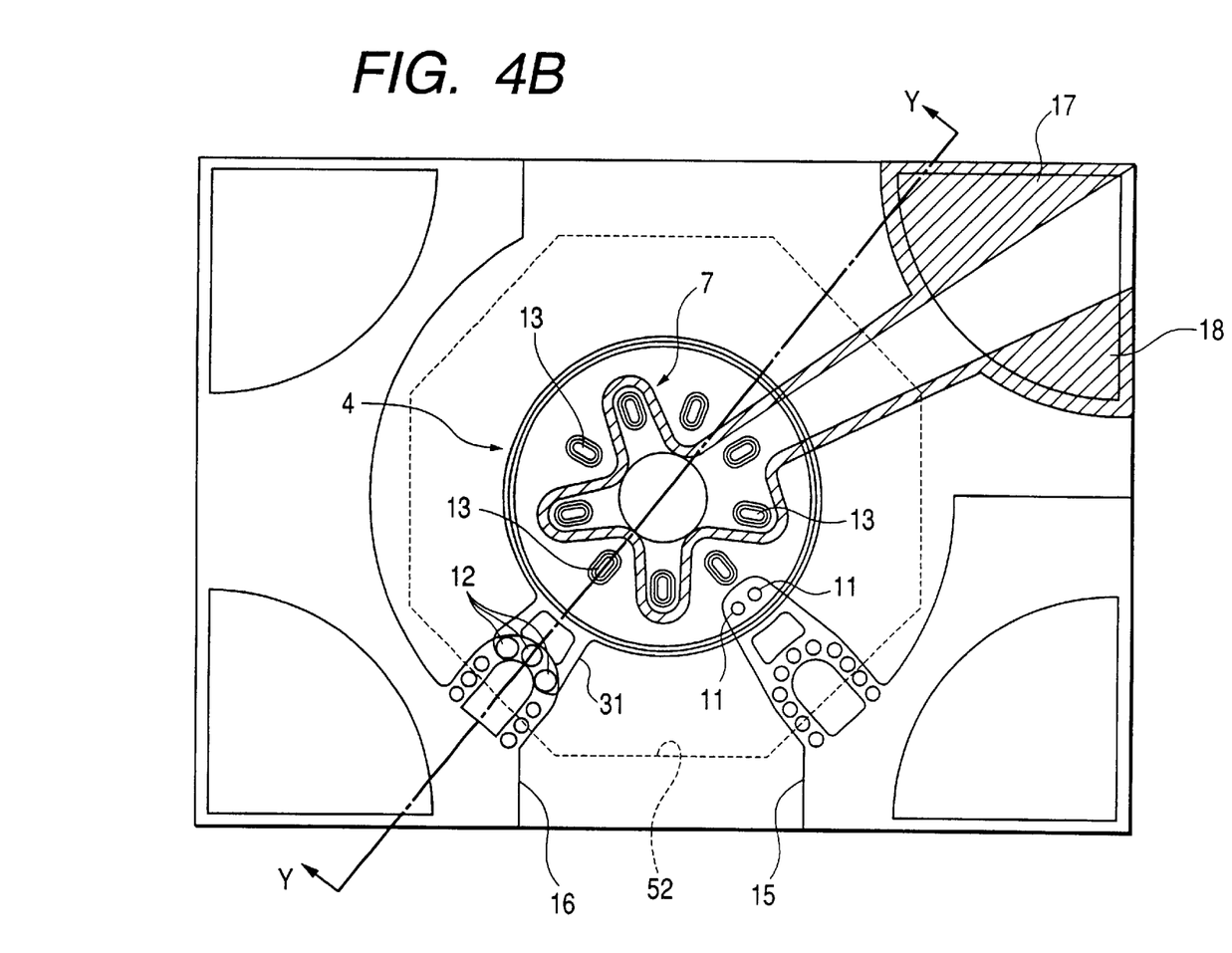

In FIGS. 4 and 5, reference numeral 13 denotes through-holes for etching and also for gas venting which are formed through the thin film of insulating material 6, the upper electrode 2, the ferroelectric thin film 1 and the lower electrode 3; and 14, through-holes for etching and also for gas. venting which are formed in the thin film of insulating material 6 around the pyroelectric detection unit 4. Further, the connecting end of the upper extraction electrode 15 is connected to the upper electrode 2 in the contact holes 11 and 11, whereas the connecting end of the lower extraction electrode 16 is connected to the connecting end 31 of the lower electrode 3 in the contact holes 12. Reference numerals 17 and 18 denote extraction electrodes +, − of the heater portion 7. As the through-holes 13 and 14 are provided in this case, a flow of gas in the direction of a perpendicular plane with respect to the pyroelectric detection unit 4 can be detected by removing part of the substrate 5 as shown in FIG. 2G.

A heater 7 is provided on top of the upper electrode 2, with a thin insulator film 6 interposed. The heater 7 is bent in a zigzag pattern to ensure the necessary length. The heater 7 is supplied with a periodic voltage to have a predetermined temperature. The thin insulator film 6 may be formed of organic matter such as polyimide or epoxy compound or inorganic matter such as SiO2 or Si3N4; insulators having lower heat conductivities than metals are preferred.

Gas passage holes 13 of a small channel area that penetrate vertically through the substrate are formed near the heater 7. In the illustrated case, nine such gas passage holes are formed equidistantly in the pyroelectric sensing portion 4. The pyroelectric sensing portion 4 and the heater 7 are located above the opening 52 in the substrate 5 but supported on the latter via the thin insulator film 6.

To operate the pyroelectric flow detector element, the heater 7 is supplied with a periodic voltage so that the temperature is modulated by a predetermined period. If there is no gas flow, the output from the pyroelectric sensing portion 4 is maximum. In the presence of a gas flow, the heater 7 is cooled in accordance with the flow rate of the gas passing through the holes 13, rising of the temperature at the pyroelectric sensing portion 4 is suppressed so that the output is decreased. Thus, the gas flow is detected based on the output difference We now describe an exemplary process for producing the pyroelectric flow detector element with reference to FIGS. 6A to 8F. The substrate 5 which is made of single-crystal MgO or Si is sputtered or otherwise treated to be overlaid with a Pt layer in a thickness of about 2000 Å so that it works as the lower electrode 3 (see FIG. 6A). The lower electrode 111 is treated by MOCVD (metalorganic chemical vapor deposition) or otherwise to be overlaid with a thin PZT or PLZT ferroelectric film 1 in a thickness of about 2 to 5 $\mu$m (see FIG. 6B). The thin ferroelectric film 1 is sputtered or otherwise treated to be overlaid with a Au or Pt layer in a thickness of about 2000 Å so that it works as the upper electrode 2 (see FIG. 6C). The upper electrode 2, the thin ferroelectric film 1 and the lower electrode 3 are sequentially patterned by photolithography (see FIGS. 7A to 7D, and 8A and 8B). As the result of patterning, through-holes which later serve as the gas passage holes 13 are formed.

Figure 8A:
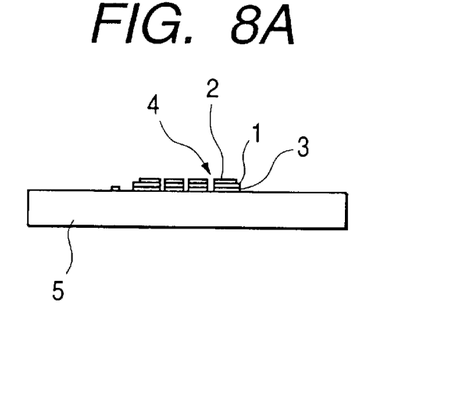
FIGS. 8A–8F are diagrams illustrative of the rest of the steps thereof.
Figure 8B:
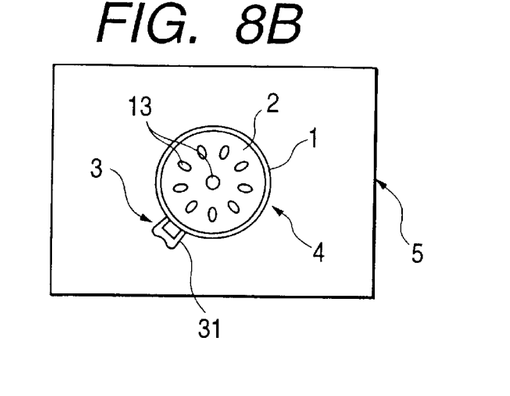
Figure 8C:
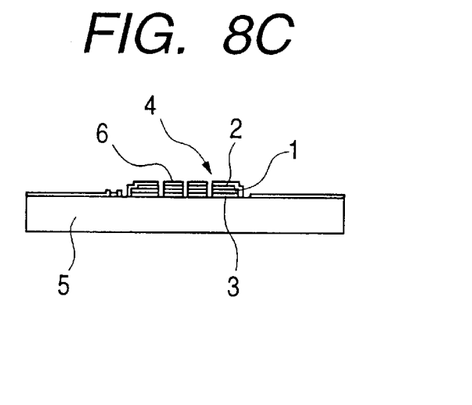
Figure 8D:
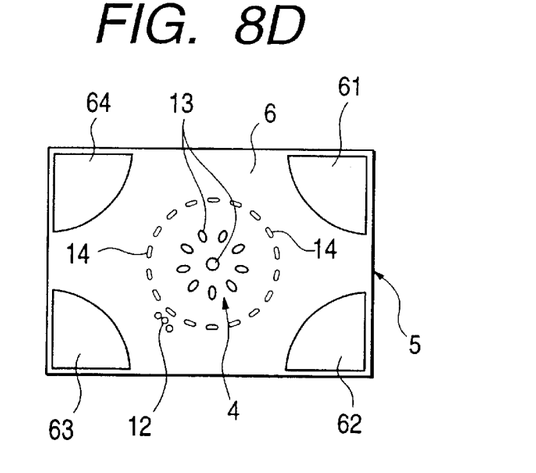
Figure 8E:
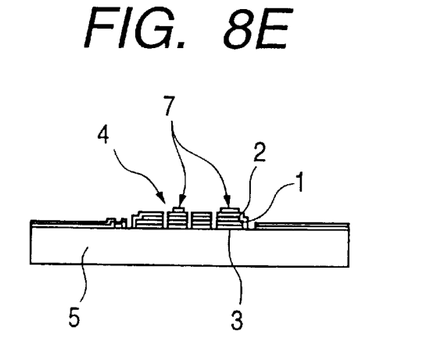
Figure 8F:
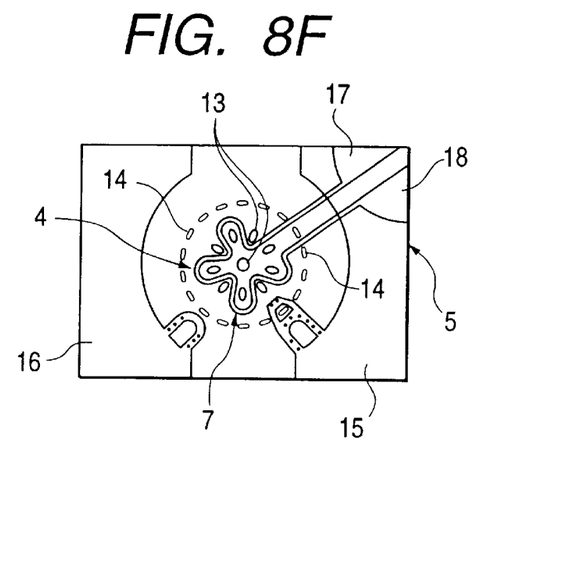

The pyroelectric sensing portion 4 is covered with a thin insulator film 6 (see FIGS. 8C and 8D). As shown specifically in FIG. 8D, the thin insulator film 6 has not only through-holes that later serve as the gas passage holes 13 but also the contact holes 11 and 12, and recesses 61, 62, 63 and 64 that serve as the base of lead-in electrodes. The thin insulator film 6 is overlaid with a heating electrode film (typically from Pt or NiCr) that later serves as the heater 7. The heating electrode film is then patterned by photolithography, with part of the Pt or NiCr being allowed to drop in the contact holes 11 and 12 so as to form the lead-in 15 for the upper electrode and the lead-in 16 for the lower electrode (see FIGS. 8E and 8F). In the illustrated case, the lead-ins for the upper and lower electrodes are formed simultaneously with the heating electrode film; however, this is not the sole case of the invention and those lead-ins maybe formed in a separate step from the heating electrode film. Subsequently, that part of the substrate 112 which is just under the pyroelectric sensing portion 4 is etched away to form the opening 52 so that the gas passage holes 13 penetrate vertically through the substrate 5. This completes the production of the pyroelectric flow detector element B.

In the above-mentioned embodiment as shown in FIG. 4A, through-holes 14 for etching and gas venting are formed around the pyroelectric detection unit 4. However, if an appropriate etching technique is employed, the through-hole 14 around the pyroelectric detection sensor 4 may not be formed as shown in FIG. 4B.

As set forth above, the microflow sensor element according to the present invention is such that the pyroelectric detection unit is provided on the substrate, the pyroelectric detection unit having the upper and lower electrodes which are respectively provided on the surface and undersurface of the ferroelectric thin film, and that the heater portion whose temperature is modulated periodically as designated is provided on the upper electrode via the thin film of insulating material. The detection output is decreased because the temperature of the heater portion is restrained from rising by a gas flow while the gas flow is existing around the microflow sensor element. Thus, the flow rate of the gas is made detectable by the output difference.

Since the pyroelectric detection unit is provided right below the heater portion, it is possible to detect any gas movement quickly with high response sensitivity, however little the gas movement may be and regardless of the direction of the gas movement.

Moreover, the provision of the through-holes for use in gas venting in or around the pyroelectric detection unit allows the detection of even the flow of gas in the direction of the perpendicular plane with respect to the pyroelectric detection unit.

Moreover, since an area of the gas passage holes is reduced, the gas flow rate can be sufficiently increased to provide higher sensitivity. In addition, the thin ferroelectric film is very thin (2 to 5 $\mu$m) and the heater is supported by the thin insulator film, so there is no need to use a thick heating electrode film. As the result of these features, the pyroelectric flow detector element can be formed as a thin enough film to reduce the heat capacity and thereby increase the response speed.

What is claimed is:

1. A microflow sensor element comprising:

a substrate;

a pyroelectric detection portion formed on said substrate, including a lower electrode formed on said substrate, a ferroelectric thin film formed on said lower electrode, and an upper electrode formed on said ferroelectric thin film;

an insulating film formed on said pyroelectric detection portion; and a heater portion whose temperature is modulated periodically as designated provided on said insulating film.

2. A microflow sensor element as claimed in claim 1, further comprising a plurality through-holes for use in gas venting which are provided in or around said pyroelectric detection unit.

3. A microflow sensor element as claimed in claim 1, wherein a pulse current at a predetermined period flows through said heater portion to periodically increase the temperature of the heater portion.

* * * * *